(12) United States Patent
Corey et al.

(10) Patent No.: US 11,903,790 B2
(45) Date of Patent: Feb. 20, 2024

(54) SELF-LIGATING ORTHODONTIC APPLIANCES

(71) Applicant: Braces On Demand Inc., Hicksville, NY (US)

(72) Inventors: Colin James Corey, Carlsbad, CA (US); Ammar Ahmed Syed, Unionville (CA); Thomas Patrick Shannon, Byron Center, MI (US)

(73) Assignee: BRACES ON DEMAND, INC., Hicksville, NY (US)

( * ) Notice: Subject to any disclaimer, the term of this patent is extended or adjusted under 35 U.S.C. 154(b) by 315 days.

(21) Appl. No.: 17/232,966

(22) Filed: Apr. 16, 2021

(65) Prior Publication Data

US 2022/0331068 A1    Oct. 20, 2022

(51) Int. Cl.
*A61C 7/28* (2006.01)

(52) U.S. Cl.
CPC ..................................... *A61C 7/28* (2013.01)

(58) Field of Classification Search
CPC .............. A61C 7/287; A61C 7/28; A61C 7/14
See application file for complete search history.

(56) References Cited

U.S. PATENT DOCUMENTS

| | | |
|---|---|---|
| 4,038,753 A | 8/1977 | Klein |
| 5,098,288 A | 3/1992 | Kesling |
| 5,275,557 A * | 1/1994 | Damon ................... A61C 7/146 433/10 |
| 5,322,435 A * | 6/1994 | Pletcher ................. A61C 7/145 433/10 |
| 5,975,893 A | 11/1999 | Chisti |

(Continued)

FOREIGN PATENT DOCUMENTS

| | | |
|---|---|---|
| EP | 1 433 435 A2 | 6/2004 |
| EP | 1 813 221 A1 | 8/2007 |

(Continued)

OTHER PUBLICATIONS

International Search Report and Written Opinion in International Patent Application No. PCT/US2020/58482, dated Feb. 4, 2021 (14 pages).

(Continued)

*Primary Examiner* — Ralph A Lewis
(74) *Attorney, Agent, or Firm* — Nixon Peabody LLP

(57) ABSTRACT

In some embodiments, apparatuses, and methods are provided herein useful to orthodontic appliances. In some embodiments, an orthodontic appliance comprises a main body assembly comprising a base on a first side of the main body assembly configured to be bonded to a patient's tooth, a cavity forming at least a first portion of an archwire slot, and a first mating mechanism, a body subassembly comprising a facial surface that opposes the base, an archwire covering configured to cover at least a portion of the cavity, and a second mating mechanism, wherein the second mating mechanism mates with the first mating mechanism to prevent disassembly of the orthodontic appliance and allow the body subassembly to move from a first position to a second position relative to the main body assembly, wherein when in the second position the archwire covering covers the at least a portion of the archwire slot.

21 Claims, 11 Drawing Sheets

(56) References Cited

U.S. PATENT DOCUMENTS

| | | | |
|---|---|---|---|
| 6,206,695 B1 | 3/2001 | Wong | |
| 7,648,360 B2 | 1/2010 | Kuo | |
| 7,704,072 B2 * | 4/2010 | Damon | A61C 7/287 433/11 |
| 7,940,258 B2 | 5/2011 | Stark | |
| 7,963,767 B2 * | 6/2011 | Lewis | A61C 7/287 433/10 |
| 8,469,704 B2 * | 6/2013 | Oda | A61C 7/14 433/10 |
| 8,992,214 B2 * | 3/2015 | Wu | A61C 7/143 433/11 |
| 9,125,709 B2 | 9/2015 | Matty | |
| 9,226,803 B2 | 1/2016 | Cosse | |
| 10,136,966 B2 | 11/2018 | Reybrouck | |
| 10,179,035 B2 | 1/2019 | Shivapuja | |
| 10,314,673 B2 | 6/2019 | Schulhof | |
| 2002/0064759 A1 | 5/2002 | Durbin | |
| 2004/0259049 A1 | 12/2004 | Kopelman | |
| 2005/0239012 A1 * | 10/2005 | Bathen | A61C 7/287 433/10 |
| 2006/0051721 A1 * | 3/2006 | Carriere Lluch | A61C 7/287 433/10 |
| 2007/0168152 A1 | 7/2007 | Matov | |
| 2008/0233528 A1 | 9/2008 | Kim | |
| 2009/0325120 A1 * | 12/2009 | Lewis | A61C 7/287 433/13 |
| 2010/0285422 A1 | 11/2010 | Wiechmann | |
| 2011/0287378 A1 | 11/2011 | Dupray | |
| 2012/0135365 A1 | 5/2012 | Cleary | |
| 2013/0081271 A1 | 4/2013 | Farzin-Nia | |
| 2014/0127638 A1 * | 5/2014 | Huang | A61C 7/34 433/11 |
| 2014/0212827 A1 | 7/2014 | Tzou | |
| 2014/0277659 A1 | 9/2014 | Kumar | |
| 2014/0326253 A1 | 11/2014 | Baratier | |
| 2017/0079747 A1 | 3/2017 | Graf | |
| 2017/0281317 A1 | 10/2017 | Bukhary | |
| 2018/0153651 A1 | 6/2018 | Tong | |
| 2018/0177570 A1 | 6/2018 | Alauddin | |
| 2018/0214258 A1 | 8/2018 | Ruan | |
| 2018/0235730 A1 | 8/2018 | Djamchidi | |
| 2018/0303583 A1 | 10/2018 | Tong | |
| 2018/0314235 A1 | 11/2018 | Mirabella | |
| 2019/0069980 A1 | 3/2019 | Kapec | |
| 2019/0175306 A1 * | 6/2019 | Lai | A61C 7/14 |
| 2020/0123383 A1 | 4/2020 | Wallin | |
| 2020/0275992 A1 | 9/2020 | Shannon | |
| 2020/0405446 A1 | 12/2020 | Shannon | |
| 2021/0015593 A1 | 1/2021 | Shannon | |
| 2021/0128275 A1 | 5/2021 | Suh | |
| 2022/0110721 A1 | 4/2022 | Shannon | |

FOREIGN PATENT DOCUMENTS

| | | |
|---|---|---|
| EP | 2 730 250 A1 | 5/2014 |
| EP | 3 170 472 A2 | 5/2017 |
| FR | 3 100 975 A1 | 3/2021 |
| WO | WO 2011/118455 A1 | 9/2011 |

OTHER PUBLICATIONS

International Search Report and Written Opinion in International Patent Application No. PCT/US2021/054387, dated Jan. 14, 2022 (15 pages).

International Preliminary Report on Patentability in International Patent Application No. PCT/US2020/58482, dated May 10, 2022 (13 pages).

International Search Report and Written Opinion in International Patent Application No. PCT/US2022/024922, dated Jun. 24, 2022 (14 pages).

International Search Report and Written Opinion in International Patent Application No. PCT/US2022/024925, dated Jul. 18, 2022 (12 pages).

International Search Report and Written Opinion in International Patent Application No. PCT/US2022/024924, dated Aug. 26, 2022 (15 pages).

* cited by examiner

SELF-LIGATING ORTHODONTIC APPLIANCES

TECHNICAL FIELD

This invention relates generally to orthodontics and, more specifically, orthodontic appliances.

BACKGROUND

Orthodontic clinicians seek to correct malocclusions by use of many different devices, such as braces, aligners, expanders, etc. Braces, one of the most commonly used appliances, include brackets, archwires, and, in some cases, ligatures. The brackets are affixed to a patient's teeth and the archwire passes through slots in the brackets (i.e., archwire slots) designed to receive the archwire. The ligatures secure the archwire within the archwire slots. Some brackets, however, do not require ligatures to secure the archwire within the archwire slot. For example, self-ligating brackets are designed such that the archwire can be secured without the use of ligatures. Such self-ligating brackets can include doors that allow access to an archwire slot and also enclose the archwire slot to secure the archwire without the use of ligatures. While such self-ligating brackets are useful, they have drawbacks. One specific drawback is their complexity. Self-ligating brackets typically include springs to bias the doors. This complexity makes the brackets more difficult, and expensive, to produce and use. Additionally, this added complexity can result in an increased risk of bracket failure. Accordingly, a need exists for self-ligating brackets that do not require the complexity of traditional self-ligating brackets.

BRIEF DESCRIPTION OF THE DRAWINGS

Disclosed herein are embodiments of systems, apparatuses, and methods pertaining to self-ligating orthodontic appliances. This description includes drawings, wherein.

Figure 1A:
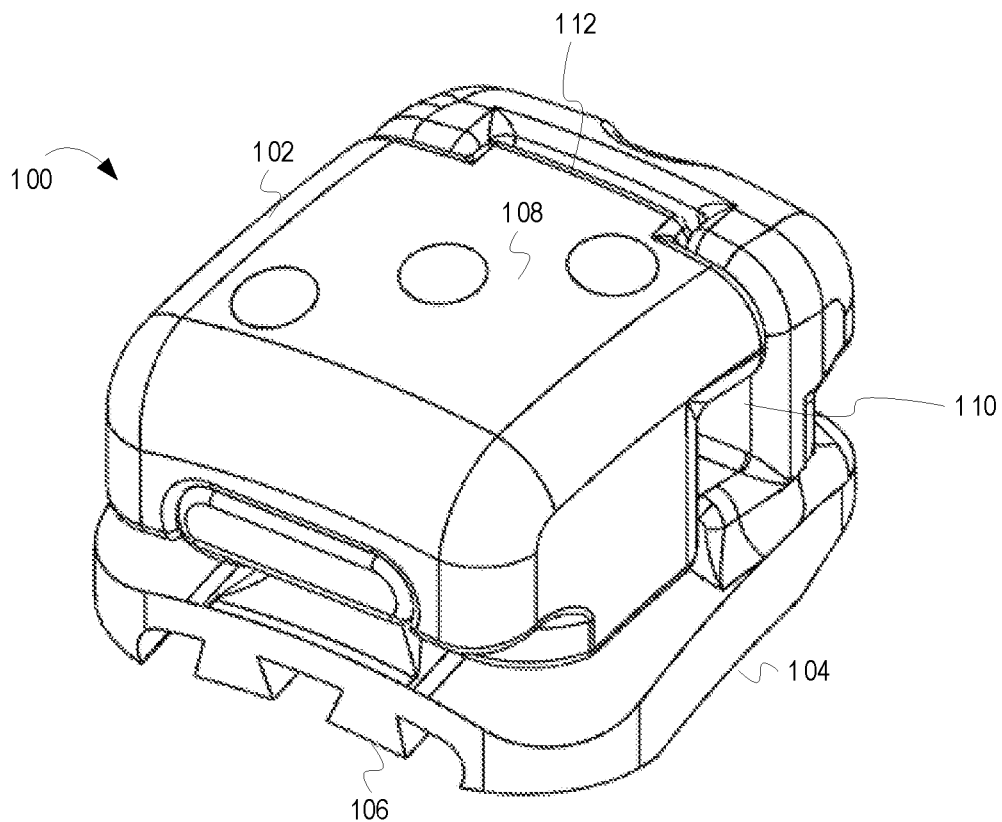
FIG. 1A is a perspective view of a bracket 100 in which a body subassembly 102 is in a second position with respect to a main body assembly 104, according to some embodiment.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to orthodontic appliances. In some embodiments, an orthodontic appliance comprises a main body assembly, wherein the main body assembly comprises a base on a first side of the main body assembly, wherein the base is configured to be bonded to a patient's tooth, a cavity, wherein the cavity forms at least a first portion of an archwire slot, and a first mating mechanism, a body subassembly, wherein the body subassembly comprises a facial surface, wherein the facial surface opposes the base, an archwire covering, wherein the archwire covering is configured to cover at least a portion of the cavity, and a second mating mechanism, wherein the second mating mechanism mates with the first mating mechanism to prevent disassembly of the orthodontic appliance and allow the body subassembly to move from a first position to a second position relative to the main body assembly, wherein when in the second position the archwire covering covers the at least a portion of the archwire slot.

As previously discussed, self-ligating brackets can be used to correct malocclusions without requiring ligatures to secure an archwire within an archwire slot. Existing self-ligating brackets utilizes spring-loaded doors that are secured to bracket bodies. The doors cover the archwire slot to secure the archwire within the archwire slot. The springs bias the door in either an open or a closed position. Additionally, in some instances, the springs can secure the door to the bracket body. While such self-ligating brackets can be useful for clinicians, they are often complex (e.g., requiring numerous pieces including springs, hinges, etc.) making them more difficult and expensive to produce and use. Described herein are orthodontic appliances, systems, and methods that seek to minimize or overcome some of these issues. Specifically, in some embodiments, a self-ligating bracket is disclosed that does not require the use of springs as a biasing mechanism. The discussion of FIGS. 1A and 1B provide an overview of such a self-ligating bracket.

Figure 1B:
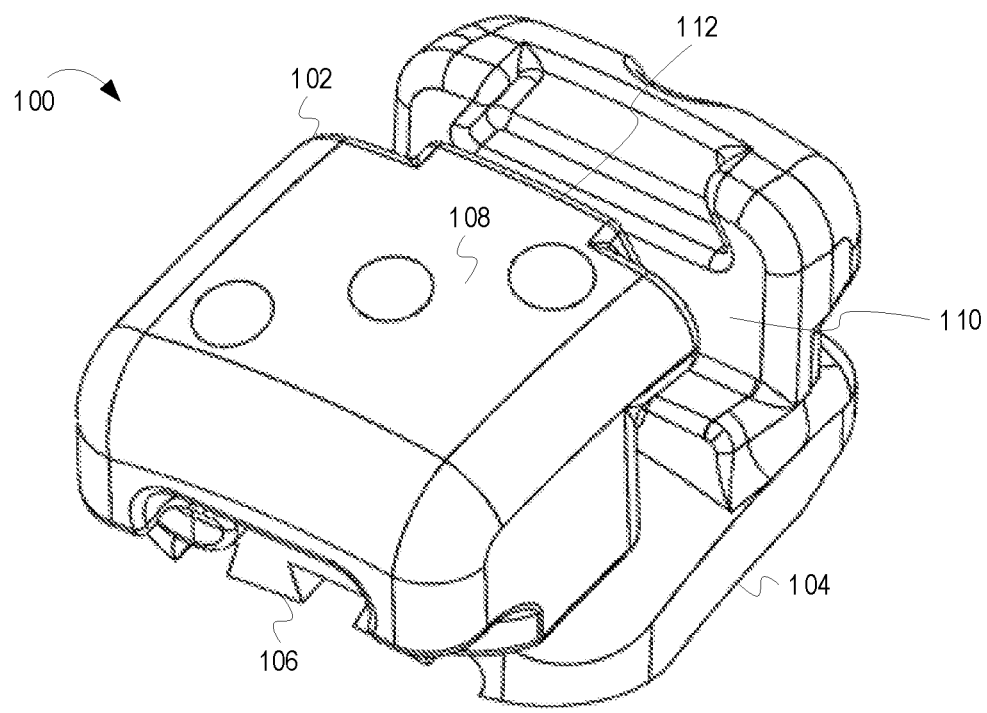
FIG. 1B is a perspective view of the bracket in which the body subassembly 102 is in a first position with respect to the main body assembly 104, according to some embodiments.

FIG. 1A is a perspective view of a bracket 100 in which a body subassembly 102 is in a second position with respect to a main body assembly 104 and FIG. 1B is a perspective view of the bracket in which the body subassembly 102 is in a first position with respect to the main body assembly 104, according to some embodiments. The bracket 100, generally, is an orthodontic appliance. Specifically, the bracket 100 can be used as a self-ligating bracket. The bracket 100 comprises a main body assembly 104 and a body subassembly 102.

The main body assembly 104 includes a base 106. The base 106 is configured to be bonded to a patient's tooth (e.g., via an adhesive, cement, etc.). The main body assembly 104 includes a cavity 110. The cavity 110 forms at least a portion of an archwire slot. The body subassembly 102 acts in concert with the main body assembly 104 to form the orthodontic appliance. The body subassembly 102 has a facial surface 108. The facial surface 108 opposes the base 106 in that, in use, the base 106 faces the patient's tooth and the facial surface 108 does not face the patient's tooth. The body subassembly 102 also includes an archwire covering 112. The archwire covering 112 is configured to cover at least a portion of the cavity 110. Dependent upon the use (e.g., the prescription, the patient's facial geometry, etc.), the cavity 110 can form the entire archwire slot or the cavity 110 in concert with the archwire covering 112 can form the entire archwire slot.

The body subassembly 102 is movable with respect to the main body assembly 104 from a first position (depicted in FIG. 1B) and a second position (depicted in FIG. 1A). In practice, the first position can be referred to as an "open" position in which the cavity 110 is accessible to receive the archwire and the second position can be referred to as a "closed" position. When in the second, or closed, position, the archwire covering 112 covers at least a portion of the archwire slot 110.

The orthodontic appliance (i.e., bracket 100) can be manufactured from any suitable material. For example, the bracket 100 can be manufactured from metal, plastic, composite, etc. In one embodiment, the bracket 100 is additively manufactured. Such additive manufacturing of orthodontic appliances is described in more detail in U.S. patent application Ser. No. 16/875,618 filed May 15, 2020 and titled SYSTEMS AND METHODS FOR MANUFACTURE OF ORTHODONTIC APPLIANCES and is herein incorporated by reference in its entirety.

Figure 2A:
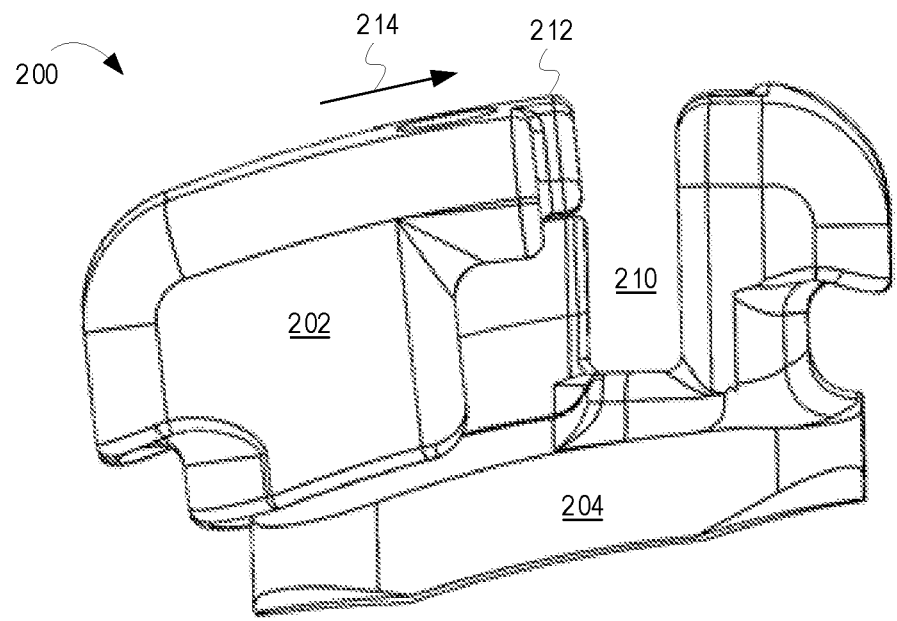
FIG. 2A is a side elevation view of a bracket 200 in which a body subassembly 202 is in a first position with respect to a main body assembly 204, according to some embodiments.
Figure 2B:
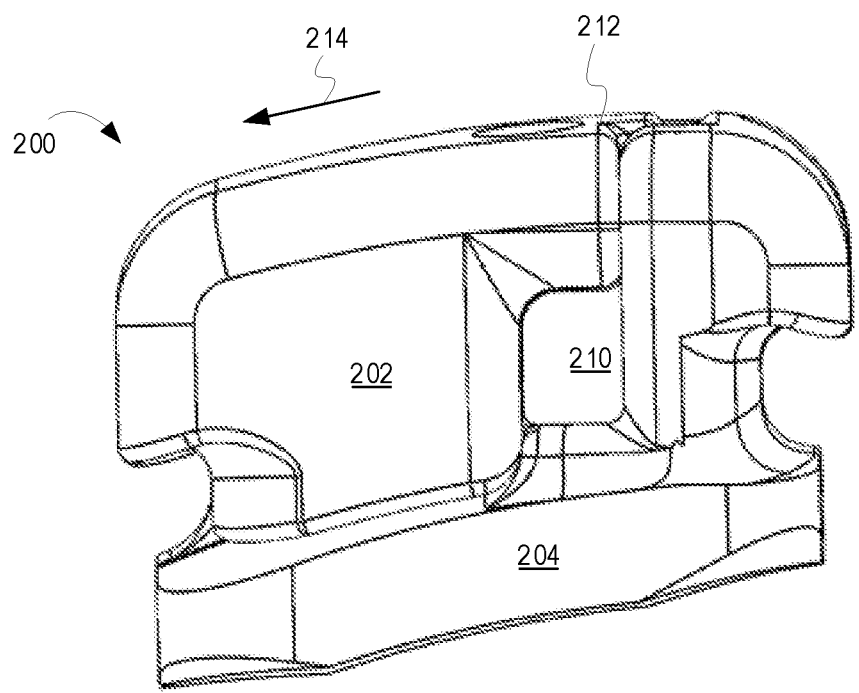
FIG. 2B is a side elevation view of the bracket 200 in which the body subassembly 202 is in a second position with respect to the main body assembly 204, according to some embodiments.

While the discussion of FIGS. 1A and 1B provides background information regarding a bracket comprising a main body assembly and a body subassembly, the discussion of FIGS. 2A and 2B provides additional detail regarding the movement of the body subassembly with respect to the main body assembly.

FIG. 2A is a side elevation view of a bracket 200 in which a body subassembly 202 is in a first position with respect to a main body assembly 204 and FIG. 2B is a side elevation view of the bracket 200 in which the body subassembly 202 is in a second position with respect to the main body assembly 204, according to some embodiments. As depicted by an arrow 214, the body subassembly 202 is movable between the first position (depicted in FIG. 2A) and the second position (depicted in FIG. 2B) with respect to the main body assembly 204. When the body subassembly 202 is in the first position, a cavity 210 is accessible. That is, when the body subassembly 202 is in the first position, access is provided to a clinician to place an archwire within the cavity 210. Accordingly, when the body subassembly 202 is in the first position, it may cover a portion of the cavity 210 or leave the cavity 210 fully, or substantially fully, exposed, dependent upon the embodiment.

When the body subassembly 202 is in the second position, an archwire covering 212 of the body subassembly at least partially covers the cavity 212. Accordingly, in some embodiments, the archwire covering 212 may form at least a portion of the archwire slot. In some embodiments, the geometry of the main body assembly 204 and/or the body subassembly 202 is such that the movement of the body subassembly 202 with respect to the main body assembly 204 is limited to a single degree of freedom. For example, dependent upon the geometry of the main body assembly 204 and/or the body subassembly 202, the movement of the body subassembly 202 with respect to the main body assembly 204 can be limited to a single linear degree of freedom or a single rotational degree of freedom. In such embodiments, the geometry of the main body assembly 204 and/or the body subassembly 202 is such that the body subassembly 202 (or main body assembly 204) is captured by the main body assembly 204 (or the body subassembly 202).

Figure 3A:
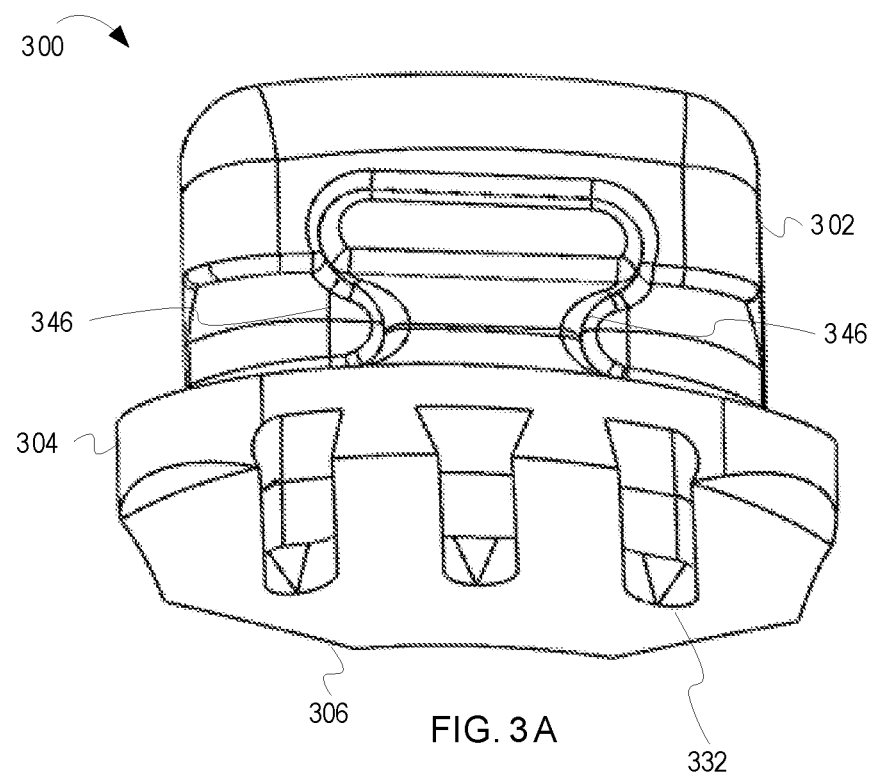
FIG. 3A is a rear perspective view of a bracket 300, according to some embodiments.
Figure 3B:
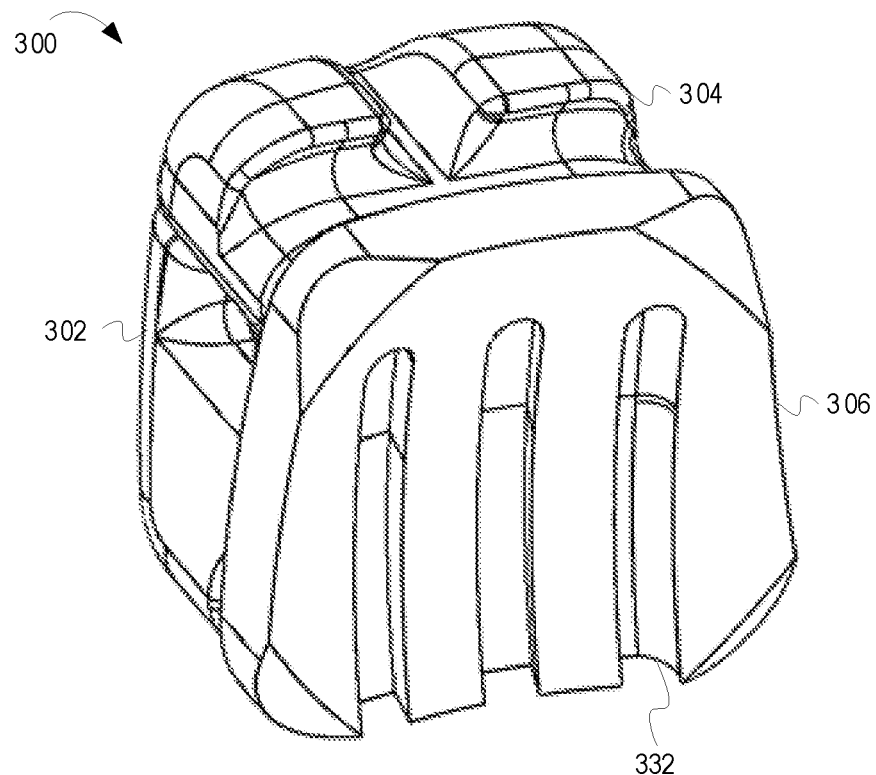
FIG. 3B is a bottom perspective view of a bracket 300, according to some embodiments.

While the discussion of FIGS. 2A and 2B provide additional detail regarding movement of the body subassembly with respect to the main body assembly, the discussion of FIGS. 3A and 3B provide additional detail regarding various views of the orthodontic appliance.

FIG. 3A is a rear perspective view of a bracket 300 and FIG. 3B is a bottom perspective view of a bracket 300, according to some embodiments. The bracket 300 includes a main body assembly 304 and a body subassembly 302. The bracket 300 depicted in FIG. 3 shows the body subassembly 302 in a second position with respect to the main body assembly 304. The main body assembly 304 and the body subassembly 302 include complementary structures 346. As discussed above briefly with respect to FIGS. 2A and 2B and in more detail below with respect to FIGS. 4A and 4B and FIGS. 6B and 7A, the complementary structures 346 provide guides for the body subassembly 302 to move with respect to the main body assembly 304. That is, the complementary structures 346 can control the movement of the body subassembly 302 with respect to the main body assembly 304. In one embodiment, the complementary structures 346 limit the movement of the body subassembly 302 to one degree of freedom with respect to the main body assembly 304. The complementary structures 346 can take any suitable form, such as channels and rails (shown in FIG. 3A, FIGS. 4A and 4B, and FIGS. 6B and 7A) or any other structure suited to guiding the movement of the body subassembly 302 with respect to the main body assembly 304.

The main body assembly 304 includes a base 306. The base 306 is configured to be bonded to a patient's tooth. Accordingly, the base 306 can take any suitable shape (e.g., including a curvature) to facilitate bonding with the patient's tooth. The base 306 can be bonded to the patient's tooth in any suitable manner. For example, the base 306 can be bonded to the patient's tooth using an adhesive. In some embodiments, the base 306 includes structures, such as dovetails 332, that allow excess bonding materials (e.g., an adhesive) to flow from behind the bracket 300.

While FIGS. 1A and 1B, FIGS. 2A and 2B, and FIGS. 3A and 3B depict a bracket in an assembled state (i.e., with the body subassembly secured to the main body assembly), FIGS. 4A and 4B and FIGS. 5A-5C depict the main body assembly (i.e., the bracket absent the body subassembly).

Figure 4A:
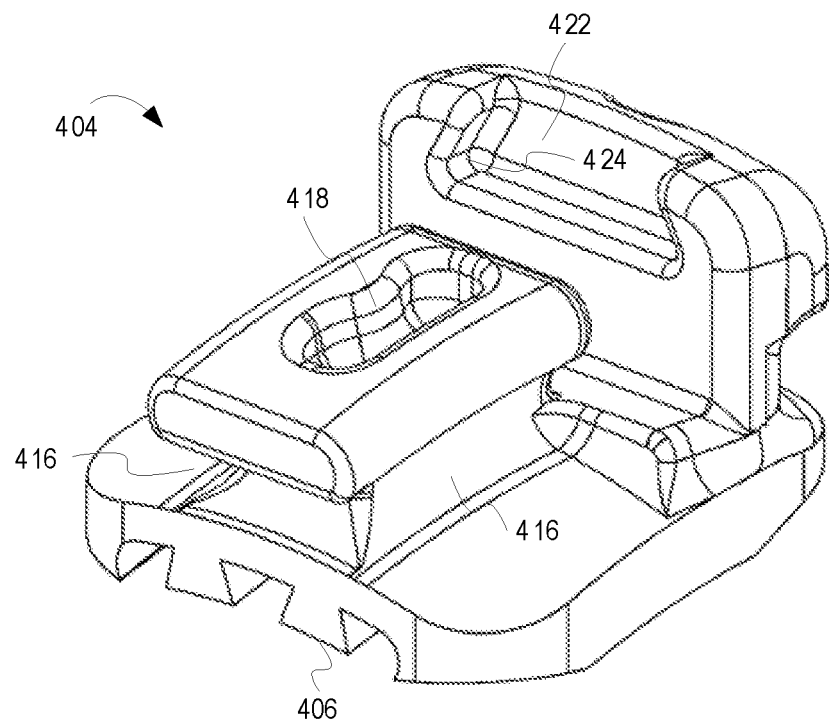
FIG. 4A is a perspective view of a main body assembly 404 of a bracket, according to some embodiments.
Figure 4B:
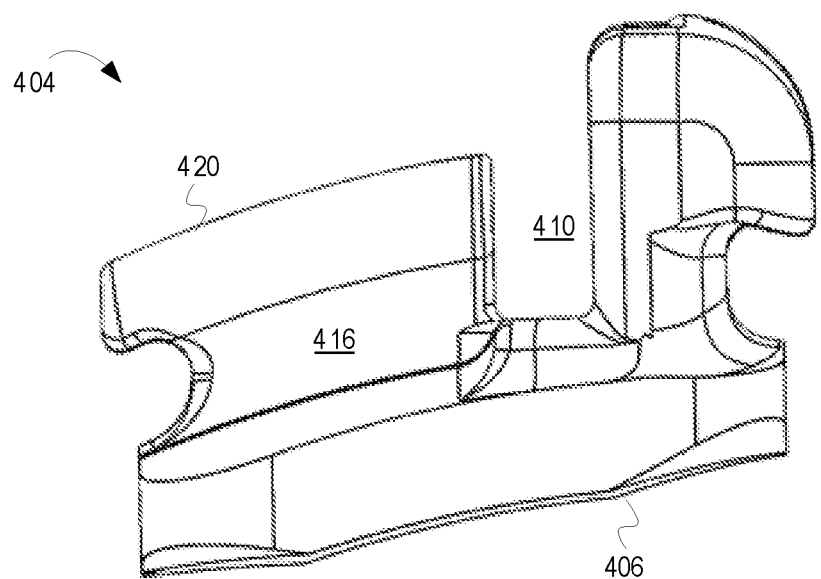
FIG. 4B is a side elevation view of the main body assembly 404 of the bracket, according to some embodiments.

FIG. 4A is a perspective view of a main body assembly 404 of a bracket and FIG. 4B is a side elevation view of the main body assembly 404 of the bracket, according to some embodiments. The main body assembly 404 serves as the body of the bracket and is bonded to a patient's tooth via a base 406. The main body assembly 404 includes a cavity 410. The cavity 410 forms at least a portion of an archwire slot. The main body assembly 404 can take any suitable geometry to receive a body subassembly, the combination of the main body assembly 404 and the body subassembly forming the bracket for use in the patient's mouth.

FIGS. 4A and 4B depict one specific geometry of the main body assembly 404 in which the main body assembly includes a complementary structure configured to interface with the body subassembly. Specifically, the main body assembly 404 depicted in FIGS. 4A and 4B includes channels 416. The channels are formed by a protrusion 420 extending from the main body assembly 404 opposite the base 406 of the main body assembly 404. The channels 416 are a complementary structure that interacts with, for example, the rails of the body subassembly depicted in, and described with respect to, FIG. 6B and FIGS. 7A and 7B. The rails interact with the channels 416 to control the movement of the body subassembly with respect to the main body assembly 404.

The main body assembly 404 includes a first mating mechanism. The first mating mechanism is configured to interact with a second mating mechanism located on the body subassembly, depicted in, and described with respect to, FIG. 6B, FIGS. 7A and 7B, and FIGS. 8A and 8B. In the example depicted in FIG. 4A, the first mating structure is an orifice 418. The orifice mates with a second mating mechanism, such as a nub, as depicted, and described with respect to, FIG. 6B, FIGS. 7A and 7B, and FIGS. 8A and 8B. Though depicted as an orifice 418 in FIG. 4A, the first mating mechanism can take any suitable form. For example, an alternative first mating mechanism and second mating mechanism are depicted in FIGS. 9A-9C.

In some embodiments, as depicted in FIG. 4A, the main body assembly 404 includes a receptacle 422. The receptacle 422 is configured to receive an archwire covering of the body subassembly, and is located proximate to the cavity 410. In one embodiment, the receptacle 422 supports the archwire covering when the body subassembly is in the second position. Additionally, in one form, the main body assembly 404 includes a locking mechanism 424. The locking mechanism 424 secures the archwire cover when the body subassembly is in the second position. Accordingly, the locking mechanism 424, if present, can take any suitable form. For example, as depicted in FIG. 4A, the locking mechanism 424 is a recessed portion of the receptacle 422 that complements the shape of the archwire covering. In such embodiments, the recessed portion (i.e., locking mechanism 424) prevents movement of the archwire covering away from the main body assembly 404 from force applied by, for example, an archwire. Additionally, the receptacle and/or locking mechanism 424 can act as a position limit stop of the body subassembly. For example, if the orifice 418 did not contain boundaries to limit the movement of the body subassembly (for example the first mating mechanism is a slot), the receptacle 422 and/or locking mechanism 424 could provide bounding of the body subassembly.

Like FIGS. 4A and 4B, FIGS. 5A-5C depict a main body assembly of a bracket.

Figure 5A:
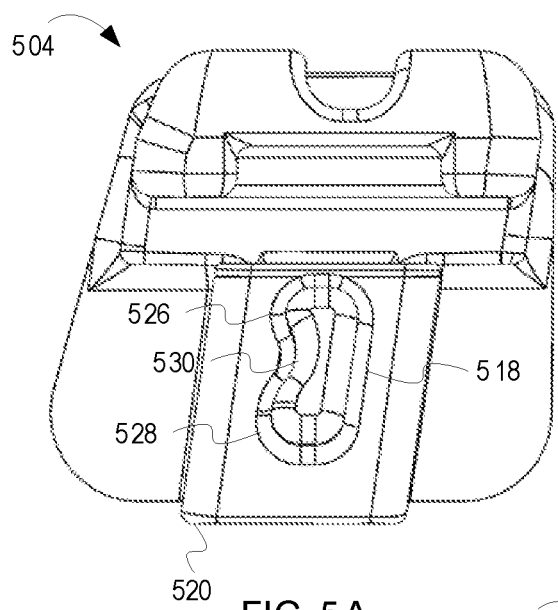
FIG. 5A is a top elevation view of a main body assembly 504 of a bracket, according to some embodiments.
Figure 5B:
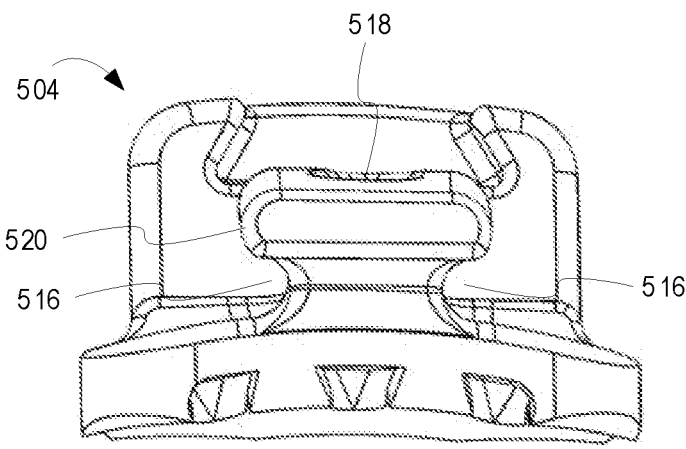
FIG. 5B is a rear elevation view of the main body assembly 504, according to some embodiments.
Figure 5C:
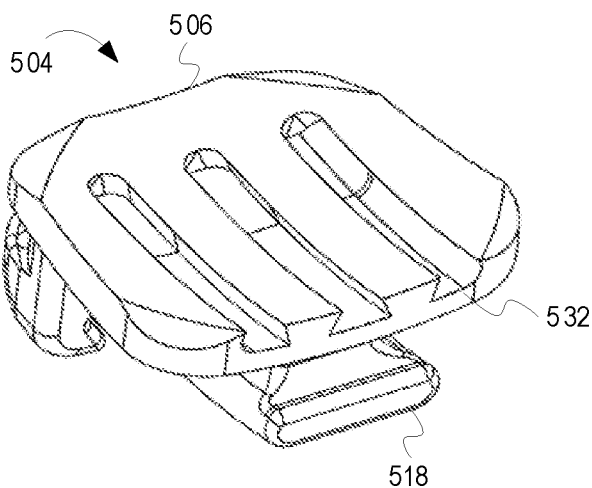
FIG. 5C is a bottom perspective view of the main body assembly 504, according to some embodiments.

FIG. 5A is a top elevation view of a main body assembly 504 of a bracket, FIG. 5B is a rear elevation view of the main body assembly 504, and FIG. 5C is a bottom perspective view of the main body assembly 504, according to some embodiments. The main body portion 504 includes a protrusion 520 featuring a first mating mechanism. As shown in FIG. 5A, the first mating mechanism is an orifice 518. The orifice 518 includes a second chamber 526 and a first chamber 528. In this specific embodiment, the second chamber 526 and the first chamber 528 are connected via a pathway 530. The orifice interfaces with a nub (e.g., such as the nub shown in FIGS. 7A and 7B) of a body subassembly. Accordingly, as the body subassembly is moved from the first position to the second position (i.e., the position in which the archwire covering covers at least a portion of the cavity), the nub moves from the first chamber 528 to the second chamber 526 via the pathway 530. This motion can, for example, be achieved via manual manipulation of the body subassembly with respect to the main body assembly 504 by a clinician.

In one embodiment, and as depicted in FIG. 5A, the pathway 530 is dimensionally smaller than the first chamber 528 and the second chamber 526. For example, if the first chamber 528 and the second chamber 526 are generally circular and the pathway 528 is a slot, the diameter of one or more of the first chamber 528 and the second chamber 526 can be greater than the width of the slot. Such a design may prevent unintended movement of the body subassembly with respect to the main body assembly 504 via physical engagement of the nub and either the first chamber 528 or the second chamber 526. That is, the nub can be sized such that it is larger than the width of the pathway 530 so that the dimensions of the pathway 530 physically restrict movement of the nub. Additionally, or alternatively, the orifice 518 can be asymmetrically shaped. For example, as shown in FIG. 5A, the pathway 530 can be offset from one or both of the first chamber 528 and the second chamber 526. In such embodiments, movement of the body subassembly from the first position to the second position may cause the subassembly to displace laterally from the main body assembly 504 as the nub passes through the pathway 530. Such a design may further prevent unintended movement of the body subassembly with respect to the main body assembly 504. It should be noted that the orifice 518 depicted in FIG. 5A is but one example of a first mating mechanism and the first mating mechanism may take any suitable form. For example, the first mating mechanism may comprise a nub or other positively extruded structure. Similarly, if the first mating mechanism is a negatively extruded feature, such as the orifice 518, it can take any suitable geometry. For example, the first chamber 528 and/or second chamber 526 need not be circular (e.g., they can take an oval, square, spherical, etc. shape) and the pathway 530 can be dimensionally smaller than the first chamber 526 and/or the second chamber 528 by being shallower than the first chamber 526 and/or the second chamber 528.

As discussed previously, and shown in more detail in FIG. 5B, the main body assembly 504 can include complementary structures that interface with complementary structures of the body subassembly. For example, as depicted in FIG. 5B, the main body assembly 504 includes channels 516 formed by a 520. In the example depicted in FIG. 5B, the channels 516 are achieved by the protrusion 520 taking a T-shape. The channels 516 act to guide the movement of the body subassembly with respect to the main body assembly 504.

Additionally, as discussed previously, the main body assembly 504 includes a base 506. The base 506 is configured to be bonded to a patient's tooth. In one embodiment, the base 506 includes features, such as dovetails 532, that help to achieve a secure bond. For example, the dovetails 532 can allow excess bonding materials (e.g., an adhesive) to flow from behind the bracket main body assembly 504.

While FIGS. 4A-4B and 5A-5C depict a main body assembly of a bracket, FIGS. 6A-6B and FIGS. 7A-7B depict a body subassembly of a bracket.

Figure 6A:
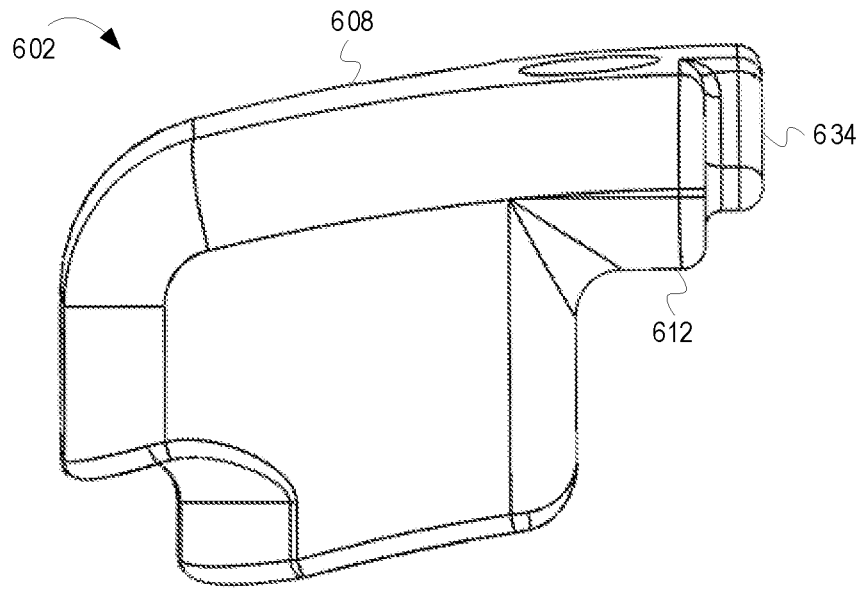
FIG. 6A is a side elevation view of a body subassembly 602, according to some embodiments.
Figure 6B:
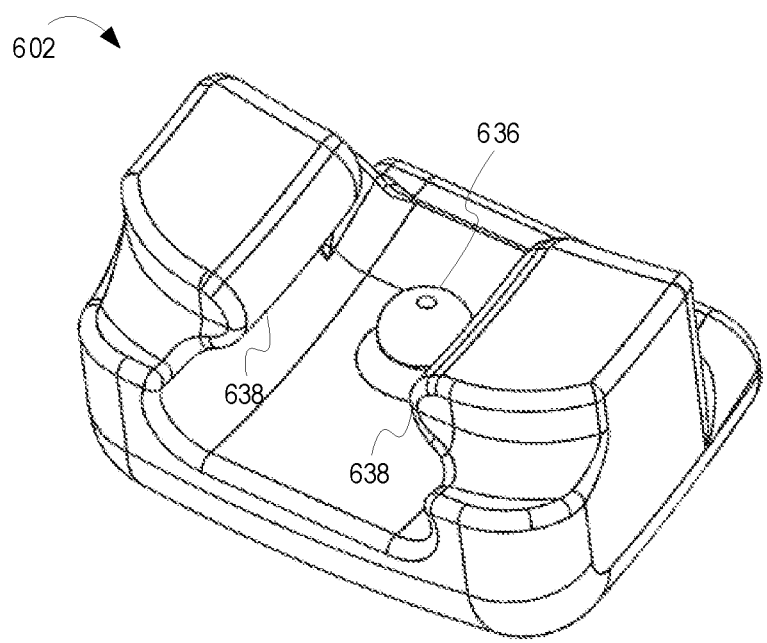
FIG. 6B is a bottom perspective view of the body subassembly 602, according to some embodiments.

FIG. 6A is a side elevation view of a body subassembly 602 and FIG. 6B is a bottom perspective view of the body subassembly 602, according to some embodiments. The body subassembly 602 generally operates with a main body assembly to form an orthodontic appliance, such as a bracket. The body subassembly 602 includes a facial surface 608 and an archwire covering 612. The body subassembly is movable with respect to the main body assembly from a first position to a second position. When in the second position, the archwire covering 612 covers at least a portion of a cavity in the main body assembly. In some embodiments, the combination of the cavity and the archwire covering 612 form an archwire slot in the bracket. Additionally, in some embodiments, the archwire covering 612 includes a lock 634. The lock 634 interacts with a locking mechanism of the main body assembly (e.g., as shown in FIG. 4A) to secure the body subassembly 602 in the second position and/or resist outward force on the body subassembly 602 from, from example, an archwire within the cavity of the main body assembly.

The body subassembly 602 includes a second mating mechanism. The second mating mechanism mates with the first mating mechanism (e.g., as depicted in FIG. 5A). In one embodiment, the second mating mechanism mates with the first mating mechanism to prevent disassembly of the orthodontic appliance and allow the body subassembly 602 to move from the first position to the second position relative to (i.e., with respect to) the main body assembly. Additionally, the mating of the first mating mechanism and the second mating mechanism can releasably secure the body subassembly 602 in the first position and/or the second position. In the example depicted in FIG. 6B, the second mating mechanism is a nub 636. The nub 636 mates with, for example, the orifice depicted in FIG. 5A moving from the first chamber to the second chamber as the body subassembly moves from the first position to the second position. The nub 636 can be cylindrically-shaped, spherically-shaped, frustoconically-shaped, etc. In one embodiment, the nub 363 features a tapered profile in which a tip of the nub 636 is wider than the base or intermediate portion of the nub 636. As another example, the nub 636 can take the form of a wedge (i.e., shaped as a triangular prism). In such embodiments, a height of the nub 636 (i.e., a height of the wedge) extends away from the body subassembly 602. The main body assembly can also feature a complementary wedge, the height of which extends away from the main body assembly. The nub 636 and the complementary wedge can be disposed such that vertical elements of the nub 636 and complementary wedge interact when the body subassembly 602 is in a closed position with respect to the main body assembly to maintain the body subassembly 602 in the closed position. As with the first mating mechanism described with respect to FIG. 5A, the second mating mechanism can take any suitable form. That is, though the second mating mechanism is depicted as the nub 636 in FIG. 6B, the second mating mechanism can take any form that allows mating of the second mating mechanism with the first mating mechanism to prevent disassembly of the orthodontic appliance and allow the body subassembly 602 to move from the first position to the second position relative to (i.e., with respect to) the main body assembly.

Additionally, in some embodiments, the body subassembly 602 includes complementary structures. The complementary structures of the body subassembly 602 interface with complementary structures of the main body assembly to control movement of the body subassembly 602 with respect to the main body assembly. In the example depicted in FIG. 6B, the complementary structures are rails 638. In this example the rails 638 interface with, for example, the channels depicted in FIGS. 4A and 4B. In one embodiment, these complementary structures limit the movement of the body subassembly 602 with respect to the main body assembly to one degree of freedom. Though the figures thus far have depicted the complementary structures as being rails and channels, such is not required. That is, the complementary structures can take any suitable form, such as dovetail rails, T-shaped rails, etc.

Figure 7A:
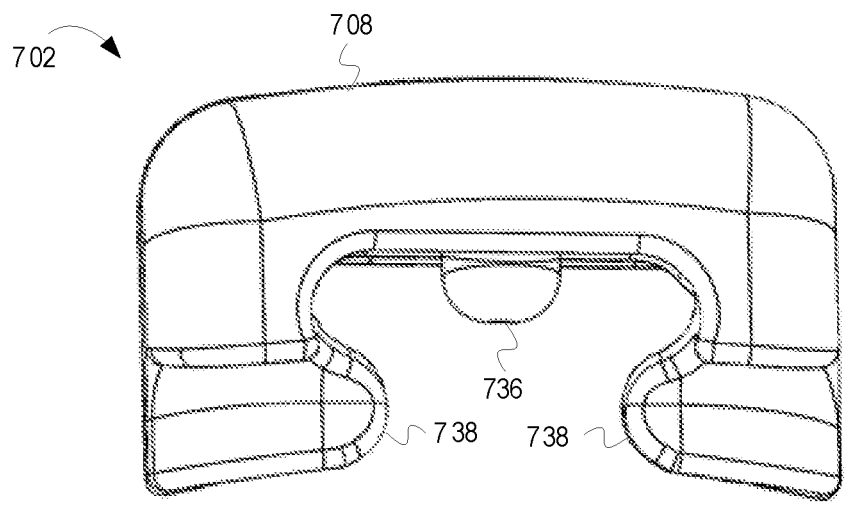
FIG. 7A is a rear elevation view of a body subassembly 702, according to some embodiments.
Figure 7B:
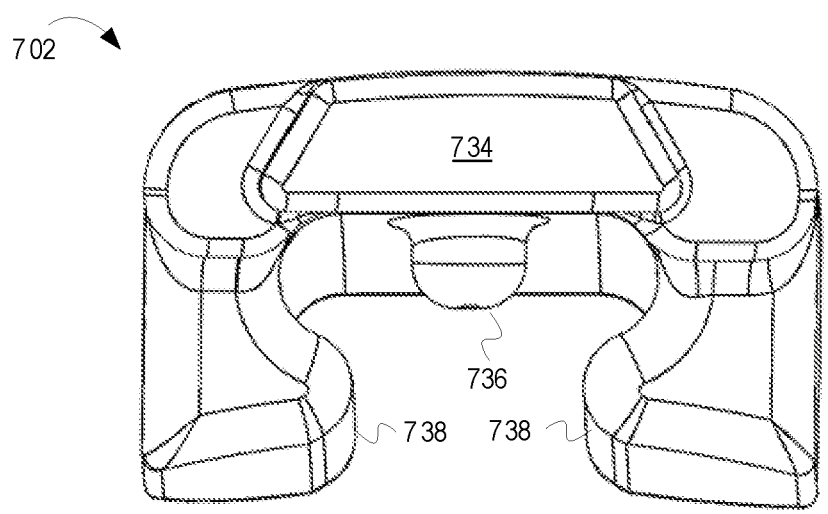
FIG. 7B is a front elevation view of the body subassembly 702, according to some embodiments.

FIG. 7A is a rear elevation view of a body subassembly 702 and FIG. 7B is a front elevation view of the body subassembly 702, according to some embodiments. FIGS. 7A and 7B show various additional views of the body subassembly 702, as described herein. The body subassembly 702 includes a facial surface 708. A second mating mechanism, depicted as a nub 736, and complementary structures, depicted as rails 738, can be seen in FIGS. 7A and 7B. Additionally, FIG. 7B shows additional detail regarding a lock 734 for an archwire covering.

Figure 8A:
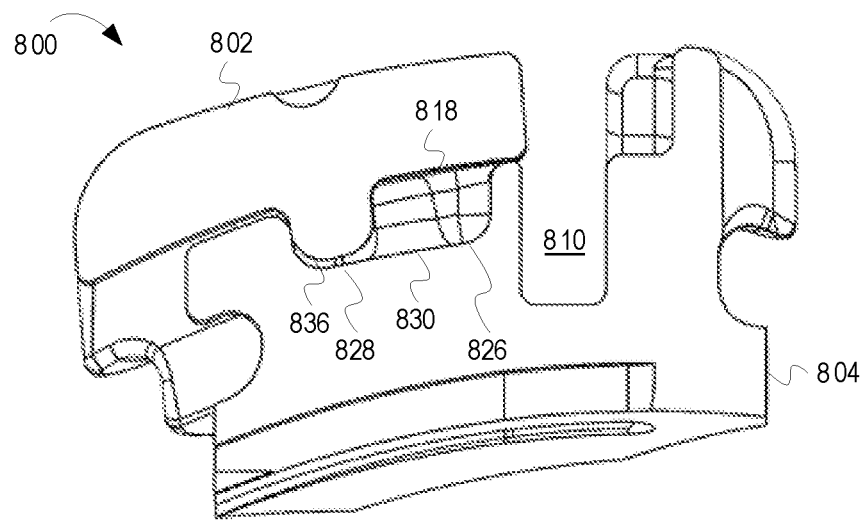
FIG. 8A is a sectional view of a bracket 800 in which a body subassembly 802 is in a first position with respect to a main body assembly 804, according to some embodiments.
Figure 8B:
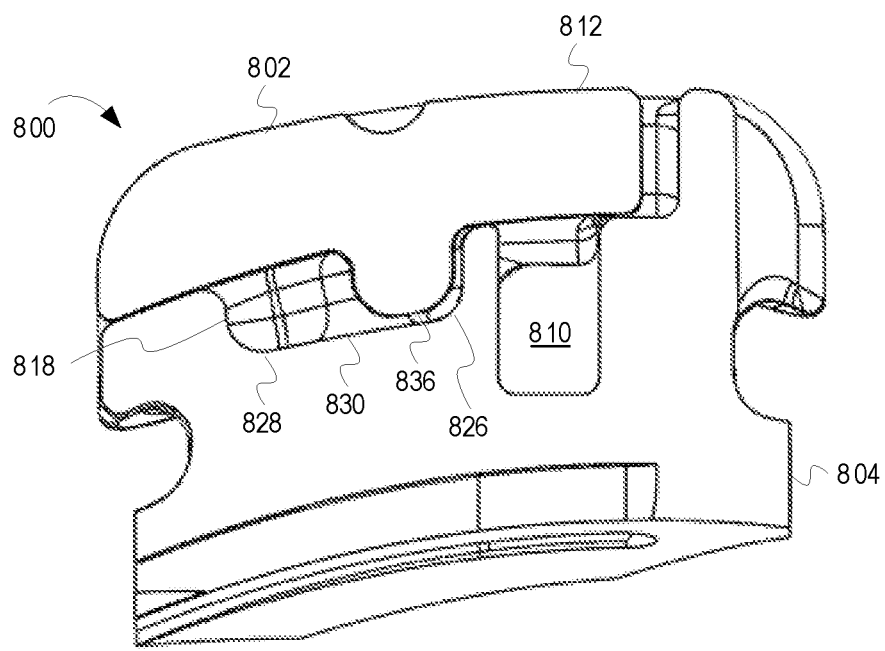
FIG. 8B is a sectional view of the bracket 800 in which the body subassembly is in a second position with respect to the main body assembly 804, according to some embodiments.
Figure 9A:
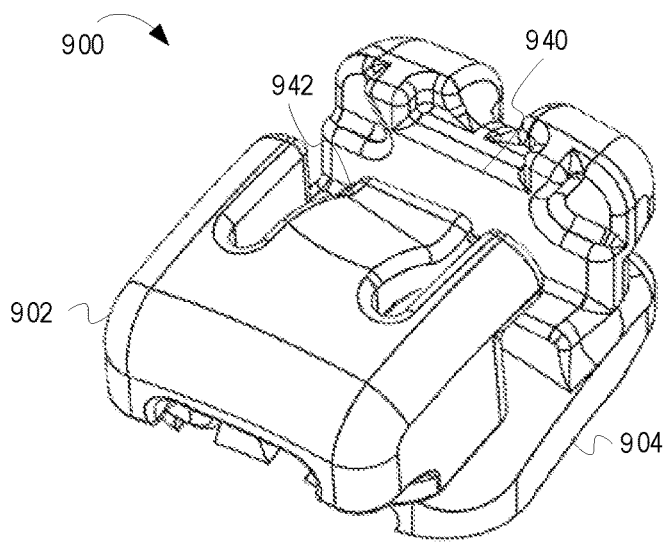
FIGS. 9A-9C are various views of a bracket 900 including a main body assembly 904 and a body subassembly 902, according to some embodiments.
Figure 9B:
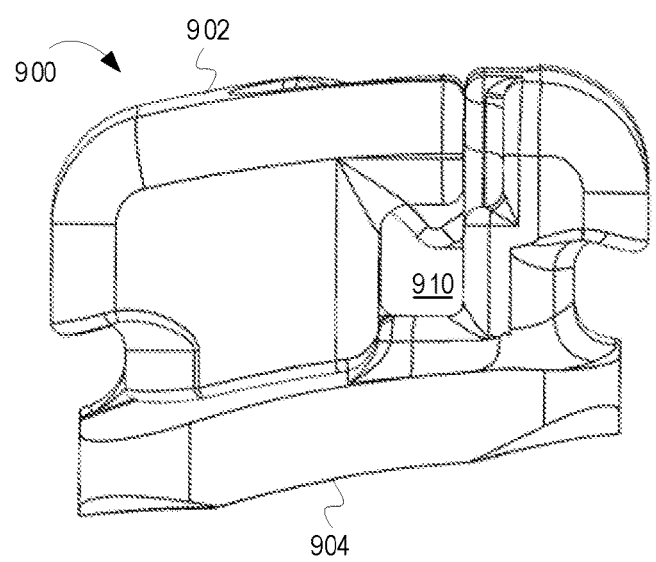
Figure 9C:
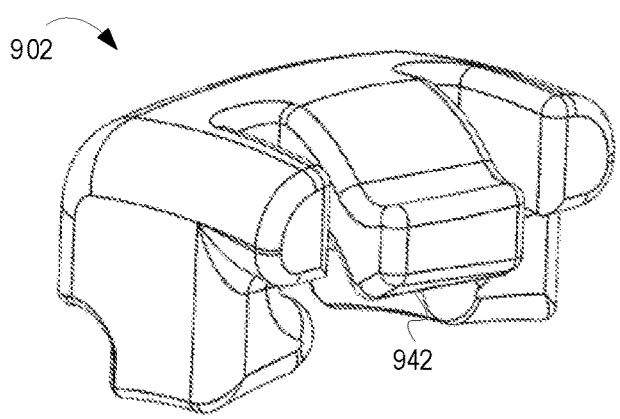

While FIGS. 3A-3B, FIGS. 4A-4B, FIGS. 5A-5C, FIGS. 6A-6B, and FIGS. 7A-7B depict an orthodontic appliance in disassembled form, FIGS. 8A and 8B depict an assembled bracket in cross section views.

FIG. 8A is a sectional view of a bracket 800 in which a body subassembly 802 is in a first position with respect to a main body assembly 804 and FIG. 8B is a sectional view of the bracket 800 in which the body subassembly is in a second position with respect to the main body assembly 804, according to some embodiments. As depicted in FIGS. 8A and 8B, the bracket 800 includes a main body assembly 804 and a body subassembly 802. The body subassembly 802 is secured to the main body assembly 804 to form the bracket 800. The body subassembly 802 is movable from the first position to the second position with respect to the main body assembly 804 and thus can be used as a self-ligating bracket. In one embodiment, to achieve self-ligation, the body subassembly 802 includes an archwire covering 812. In such embodiments, the archwire covering 812 covers at least a portion of a cavity 810 that exists within the main body assembly 804. The archwire passes through the cavity 810 and one or both of the cavity 810 and the archwire covering 812 form an archwire slot for the bracket 800.

The main body assembly 804 includes a first mating mechanism and the body subassembly 802 includes a second mating mechanism. In one embodiment, second mating mechanism mates with the first mating mechanism to prevent disassembly of the bracket 800 and allow the body subassembly 802 to move from the first position to the second position relative to the main body assembly 804. In the example depicted in FIGS. 8A and 8B, the first mating mechanism is an orifice 818 located on the main body assembly 804 and the second mating mechanism is a nub 836 located on the body subassembly 802. The orifice 818 includes a first chamber 828 and a second chamber 826. The first chamber 828 and the second chamber 826 are connected via pathway 830. As depicted in FIG. 8A, the nub 836 is located in the first chamber 828 when the body subassembly 802 is in the first position. As depicted in FIG. 8B, the nub 836 is located in the second chamber 826 when the body subassembly 802 is in the second position. When moving from the first position to the second position, the nub 836 passes from the first chamber 828 to the second chamber 826 via the pathway 830.

While the previous figures depict a first example of a bracket contemplated by this disclosure, FIGS. 9A-9C depict a second example of a bracket contemplated by this disclosure.

FIGS. 9A-9C are various views of a bracket 900 including a main body assembly 904 and a body subassembly 902, according to some embodiments. The main body assembly 904 includes a first mating mechanism 940 and the body subassembly 902 includes a second mating mechanism 942. In the example depicted in FIGS. 9A-9C, the first mating mechanism 940 comprises a latch and the second mating mechanism 942 comprises a hook. As with the previous examples provided, the second mating mechanism 942 mates with the first mating mechanism 940 to prevent disassembly of the bracket 900 and allow the body subassembly 902 to move from the first position to the second position relative to the main body assembly 904. The bracket 910 also includes a cavity 910. The body subassembly includes an archwire covering that at least partially covers the cavity 910 when the body subassembly 902 is in the second position.

While FIGS. 9A-9C depict a second example of a bracket contemplated by this disclosure, FIGS. 10A-10C depict a third example of a bracket contemplated by this disclosure.

FIGS. 10A-10C are various views of a bracket 1000 including a main body assembly 1004 and a body subassembly 1002, according to some embodiments. The body subassembly 1002 mates with the main body assembly 1004 to form the bracket 1000. The main body subassembly 1004 includes a first mating mechanism and the body subassembly 1002 includes a second mating assembly. The second mating mechanism mates with the first mating mechanism to prevent disassembly of the orthodontic appliance 1000 and allow the body subassembly 1002 to move from a first position to a second position relative to the main body assembly 1004. In the example depicted in FIGS. 10A-10C, the first mating mechanism is a recess 1040 and the second mating mechanism is a connector 1040. The recess 1040 and the connector 1042 are sized such that the connector 1042 seats in the recess 1040 when the body subassembly 1002 is moved into the second position with respect to the main body assembly 1040. For example, the connector 1042 can protrude from the body subassembly 1002 and be cylindrical in shape. Additionally, the diameter of the connector 1042 need not be constant. For example, as depicted in the example provided in FIGS. 10A-10C, the connector 1042 has a first diameter at a first end and a second diameter at a second end, the second diameter being greater than the first diameter. Similarly, in some embodiments, the recess 1040 can be shaped in a complementary manner to increase engagement between the connector 1042 and the recess 1040.

Figure 10:
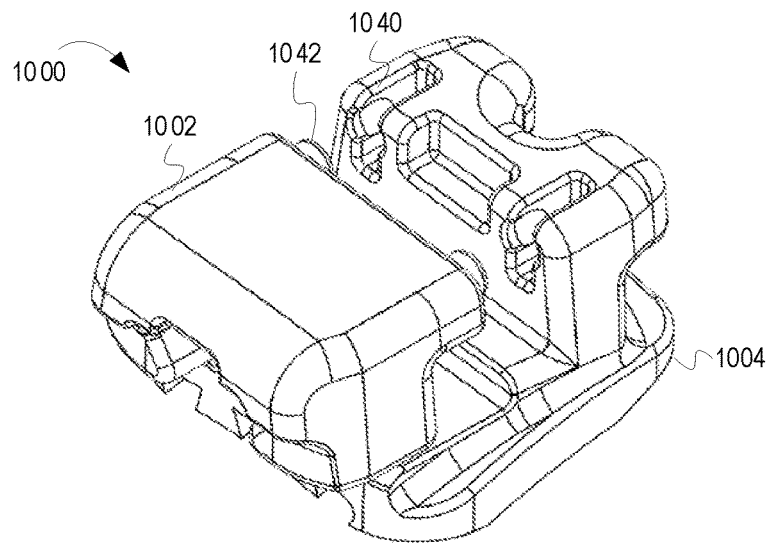
FIGS. 10A-10C are various views of a bracket 1000 including a main body assembly 1004 and a body subassembly 1002, according to some embodiments.
Figure 10:
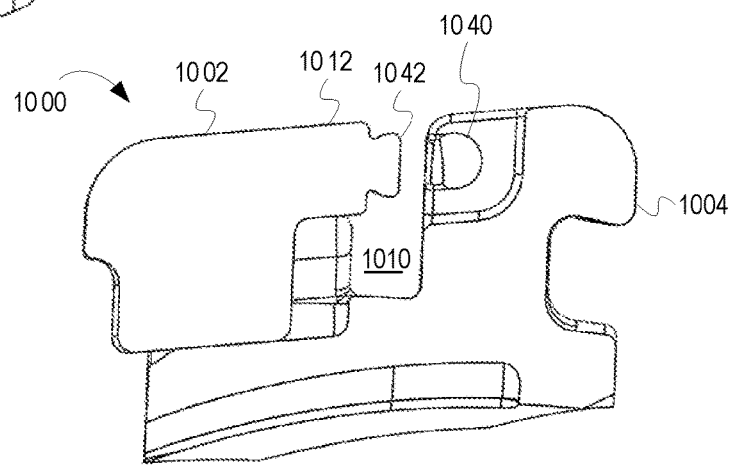
Figure 10:
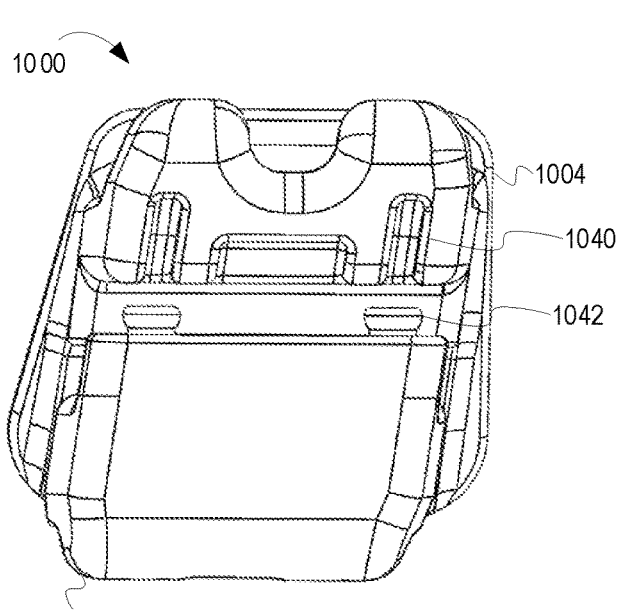

Though FIGS. 1-8 depict first example mating mechanisms, FIG. 9 depicts a second example mating mechanisms, and FIG. 10 depicts third example mating mechanisms, it should be understood that embodiments are not so limited. That is, though only a small variety of example mating mechanisms are depicted in the figures, any suitable types of mating mechanisms may be employed by the disclosure provided herein.

Figure 11:
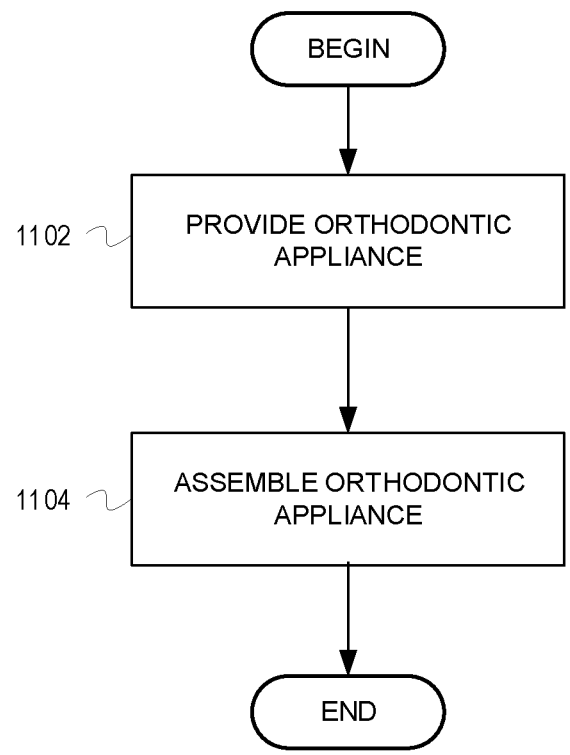
FIG. 11 is a flow chart depicting example operations for use of an orthodontic appliance, according to some embodiments.

While the discussion of FIGS. 1-10 provides detail regarding orthodontic appliances, the discussion of FIG. 11 describes a method for use of an orthodontic appliance.

FIG. 11 is a flow chart depicting example operations for use of an orthodontic appliance, according to some embodiments. The flow begins at block 1102.

At block 1102, an orthodontic appliance is provided. The orthodontic appliance can, for example, be provided via sale or manufacture of the orthodontic appliance. As one example, the orthodontic appliance can be additively manufactured. In some embodiments, the orthodontic appliance is a self-ligating bracket, as described herein. In such embodiments, the self-ligating bracket comprises a main body assembly and a body subassembly. The main body assembly comprises a base on a first side of the main body assembly, a cavity, and a first mating mechanism. The base is configured to be bonded to a patient's tooth. The cavity forms at least a portion of an archwire slot. The body subassembly comprises a facial surface, an archwire covering, and a second mating mechanism. The facial surface opposes the base and the archwire covering is configured to cover at least a portion of the cavity. The flow continues at block 1104.

At block 1104, the orthodontic appliance is assembled. For example, a clinician can assemble the orthodontic appliance, or the orthodontic appliance can be assembled by an entity manufacturing the orthodontic appliance and/or offering the orthodontic appliance for sale. In the case of the self-ligating bracket described above, the orthodontic appliance is assembled by securing the body subassembly to the main body assembly via the first mating mechanism and the second mating mechanism. In some embodiments, securing the body subassembly to the main body assembly via the first and second mating mechanisms prevents disassembly of the orthodontic appliance and allows the body subassembly to move from a first position to a second position relative to the main body assembly. When in the second position, the archwire covering covers at least a portion of the cavity.

In some embodiments, an orthodontic appliance comprises a main body assembly, wherein the main body assembly comprises a base on a first side of the main body assembly, wherein the base is configured to be bonded to a patient's tooth, a cavity, wherein the cavity forms at least a first portion of an archwire slot, and a first mating mechanism, a body subassembly, wherein the body subassembly comprises a facial surface, wherein the facial surface opposes the base, an archwire covering, wherein the archwire covering is configured to cover at least a portion of the cavity, and a second mating mechanism, wherein the second mating mechanism mates with the first mating mechanism to prevent disassembly of the orthodontic appliance and allow the body subassembly to move from a first position to a second position relative to the main body assembly, wherein when in the second position the archwire covering covers the at least a portion of the archwire slot.

In some embodiments, a method for use of an orthodontic appliance comprises providing the orthodontic appliance, wherein the orthodontic appliance comprises a main body assembly, wherein the main body assembly comprises a base on a first side of the main body assembly, wherein the base is configured to be bonded to a patient's tooth, a cavity, wherein the cavity forms at least a first portion of an archwire slot, and a first mating mechanism, a body subassembly, wherein the body subassembly comprises a facial surface, wherein the facial surface opposes the base, an archwire covering, wherein the archwire covering is configured to cover at least a portion of the cavity, and a second mating mechanism, and assembling the orthodontic appliance, wherein the assembling the orthodontic appliance comprises securing the body subassembly to the main body assembly via the first mating mechanism and the second mating mechanism, wherein securing the body subassembly to the main body assembly prevents disassembly of the orthodontic appliance and allows the body subassembly to move from a first position to a second position relative to the main body assembly, wherein when in the second position the archwire covering covers the at least a portion of the cavity.

In some embodiments, an orthodontic appliance comprises a main body assembly, wherein the main body assembly comprises a base on a first side of the main body assembly, wherein the base is configured to be bonded to a patient's tooth, an orifice, wherein the orifice is located opposite the base, wherein the base includes a first chamber and a second chamber, wherein the first chamber and the second chamber are connected via a pathway, and wherein the pathway is dimensionally smaller than one or more of the first chamber and the second chamber, and a cavity, wherein the cavity forms at least a portion of an archwire slot, and a body subassembly, wherein the body subassembly comprises a facial surface on a first side of the body subassembly, an archwire covering, wherein the archwire covering is configured to cover at least a portion of the cavity, a nub opposite the first side of the body subassembly, wherein the nub is configured to mate with the orifice to secure the body subassembly in a second position in which the archwire covering covers at least a portion of the cavity, wherein the body subassembly is movable from a first position to the second position, wherein when in the first position the nub is located in the first chamber and when in the second position the nub is located in the second chamber.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An orthodontic appliance, the orthodontic appliance comprising:
    a main body assembly, wherein the main body assembly comprises:
        a base on a first side of the main body assembly, wherein the base is configured to be bonded to a patient's tooth;
        a cavity, wherein the cavity forms at least a first portion of an archwire slot; and
        a first mating mechanism, wherein the first mating mechanism includes a first chamber and a second chamber, wherein the first chamber and the second chamber are connected via a pathway that is laterally offset from the first chamber and the second chamber;
    a body subassembly, wherein the body subassembly comprises:
        a facial surface, wherein the facial surface opposes the base;
        an archwire covering, wherein the archwire covering is configured to cover at least portion of the cavity; and
        a second mating mechanism opposite the facial surface of the body subassembly, wherein the second mating mechanism mates with the first mating mechanism to prevent disassembly of the orthodontic appliance and allow the body subassembly to move from a first position to a second position relative to the main body assembly, wherein when in the second position the archwire covering covers the at least a portion of the archwire slot and the second mating mechanism is located in the second chamber.

2. The orthodontic appliance of claim 1, wherein the first mating mechanism includes an orifice and the second mating mechanism includes a nub.

3. The orthodontic appliances of claim 2, wherein in the orifice includes a first chamber and a second chamber, wherein the first chamber and the second chamber are connected via a pathway, and wherein the pathway is dimensionally smaller than one or more of the first chamber and the second chamber.

4. The orthodontic appliance of claim 3, wherein the pathway is offset from at least one of the first chamber and the second chamber.

5. The orthodontic appliance of claim 1, wherein neither the first mating mechanism nor the second mating mechanism include a spring.

6. The orthodontic appliance of claim 1, wherein the main body assembly and the body subassembly include complementary structures, wherein the complementary structures limit movement of the body subassembly to one degree of freedom relative to the main body assembly.

7. The orthodontic appliance of claim 6, wherein the complementary structures include one or more of channels and rails.

8. A method for use of an orthodontic appliance, the method comprising:
    providing the orthodontic appliance, wherein the orthodontic appliance comprises:
        a main body assembly, wherein the main body assembly comprises:
            a base on a first side of the main body assembly, wherein the base is configured to be bonded to a patient's tooth;
            a cavity, wherein the cavity forms at least a first portion of an archwire slot; and
            a first mating mechanism, wherein the first mating mechanism includes a first chamber and a second chamber, wherein the first chamber and the second chamber are connected via a pathway that is laterally offset from the first chamber and the second chamber;
        a body subassembly, wherein the body subassembly comprises:
            a facial surface, wherein the facial surface opposes the base;
            an archwire covering, wherein the archwire covering is configured to cover at least portion of the cavity; and a second mating mechanism; and assembling the orthodontic appliance, wherein the assembling the orthodontic appliance comprises securing the body subassembly to the main body assembly via the first mating mechanism and second mating mechanism, wherein securing the body subassembly to the main body assembly prevents disassembly of the orthodontic appliance and allows the body subassembly to move from a first position to a second position relative to the main body assembly, wherein when in the second position the archwire covering cover the at least a portion of the cavity and the second mating mechanism is located in the second chamber.

9. The method of claim 8, wherein the first mating mechanism comprises an orifice, and wherein the second mating mechanism comprises a nub.

10. The method of claim 9, wherein in the orifice includes a first chamber and a second chamber, wherein the first chamber and the second chamber are connected via a pathway, and wherein the pathway is dimensionally smaller than one or more of the first chamber and the second chamber.

11. The method of claim 10, wherein the pathway is offset from at least one of the first chamber and the second chamber.

12. The method of claim 8, wherein the main body assembly and the body subassembly include complementary structures, wherein the complementary structures limit movement of the body subassembly to one degree of freedom relative to the main body assembly.

13. The orthodontic appliance of claim 12, wherein the complementary structures include one or more of channels and rails.

14. The method of claim 8, wherein neither the first mating mechanism nor the second mating mechanism include a spring.

15. The method of claim 8, wherein the first mating mechanism releasably secures the body subassembly in the second position via physical engagement between the first mating mechanism and the second mating mechanism.

16. The method of claim 8, wherein the first mating mechanism captures the second mating mechanism, preventing separation of the main body assembly and the body subassembly.

17. An orthodontic appliance, the orthodontic appliance comprising:

a main body assembly, wherein the main body assembly comprises:
 a base on a first side of the main body assembly, wherein the base is configured to be bonded to a patient's tooth;
 an orifice, wherein the orifice is located opposite the base, wherein the orifice includes a first chamber and a second chamber, wherein the first chamber and the second chamber are connected via a pathway, wherein the pathway is dimensionally smaller than one or more of the first chamber and the second chamber, and wherein the pathway is laterally offset from the first chamber and the second chamber; and
 a cavity, wherein the cavity forms at least a first portion of an archwire slot; and a body subassembly, wherein the body subassembly comprises:
 a facial surface on a first side of the body subassembly;
 an archwire covering, wherein the archwire is configured to cover at least a portion of the cavity;
 a nub opposite the first side of the body subassembly, wherein the nub is configured to mate with the orifice to secure the body subassembly in a second position in which the archwire covering covers at least a portion of the cavity;
wherein the body subassembly is movable from a first position to the second position, wherein when in the first position the nub is located in the first chamber and when in the second position the nub is located in the second chamber.

18. The orthodontic appliance of claim 17, wherein the nub is captured within the orifice.

19. The orthodontic appliance of claim 17, wherein the body subassembly is secured in the second position via physical engagement between the nub and the second chamber.

20. The orthodontic appliance of claim 17, wherein the main body assembly and the body subassembly include complementary structures, wherein the complementary structures limit movement of the body subassembly to one degree of freedom relative to the main body assembly.

21. The orthodontic appliance of claim 20, wherein the complementary structures include one or more of channels and rails.

* * * * *